United States Patent [19]

Miyakawa

[11] Patent Number: 4,617,580
[45] Date of Patent: Oct. 14, 1986

[54] APPARATUS FOR RECORDING ON DIFFERENT TYPES OF MEDIUMS

[75] Inventor: Akira Miyakawa, Tanashi, Japan

[73] Assignee: Canon Kabushiki Kaisha, Tokyo, Japan

[21] Appl. No.: 641,022

[22] Filed: Aug. 15, 1984

[30] Foreign Application Priority Data

Aug. 26, 1983 [JP] Japan .................................. 58-155000
Aug. 26, 1983 [JP] Japan .................................. 58-155001
Aug. 26, 1983 [JP] Japan .................................. 58-155002

[51] Int. Cl.⁴ ...................... G01D 18/00; G01D 15/18
[52] U.S. Cl. .................................. 346/136; 346/140 R; 250/571
[58] Field of Search ...................... 346/140 R, 75, 136; 250/571

[56] References Cited

U.S. PATENT DOCUMENTS

| | | | |
|---|---|---|---|
| 3,928,718 | 12/1975 | Sagae | 346/75 X |
| 4,087,825 | 5/1978 | Chen | 346/75 |
| 4,328,504 | 5/1982 | Weber | 346/75 |
| 4,382,262 | 5/1983 | Savit | 346/75 X |

Primary Examiner—Joseph W. Hartary
Attorney, Agent, or Firm—Fitzpatrick, Cella, Harper & Scinto

[57] ABSTRACT

An ink-jet printer has an ink-jet printing unit for recording an image by attaching ink onto a recording medium in accordance with data, photo-sensors for determining whether the recording medium is an overhead projector film or a normal paper sheet by utilizing the difference in light-transmitting properties therebetween, and a central processing unit for controlling the density of the image recorded by the ink-jet printing unit in accordance with the determination result of the photo-sensors.

10 Claims, 11 Drawing Figures

APPARATUS FOR RECORDING ON DIFFERENT TYPES OF MEDIUMS

BACKGROUND OF THE INVENTION

1. Field of the Invention

The present invention relates to a recording apparatus for attaching a recording material onto a recording medium so as to record an image and, more particularly, a recording apparatus which can record on different types of recording medium.

2. Description of the Prior Art

In a recording apparatus, recording quality is greatly affected by the physical properties of the recording medium.

For example, in an ink-jet printer, the use of special paper is recommended. When such special paper is used, good printing quality is obtained.

The recommended paper must satisfy various conditions in, for example, diffusion isotropicity, diffusion speed, adsorption speed, and reflection density of printed ink droplets. When printing is performed by mounting a light-transmitting recording medium such as a film for an overhead projector (to be referred to as an OHP hereinafter) on such a printer, the printing quality may be significantly degraded depending upon the properties of the recording medium. In the worst case, the printed ink may not be fixed. In view of this problem, it has been proposed to perform a surface treatment of the OHP film to form a thin film of gelatin or PVA, and so improve the fixing performance.

However, an improvement in the fixing performance does not necessary improve other properties of the OHP film. Moreover, this recording medium has a low printing density which is attributed to the differences in basic properties between this specially treated OHP film and normal paper.

More specifically, unlike paper, OHP film exhibits low diffusion property (i.e., low dot extension). And improving fixing property means a decrease in diffusion property in the case of the OHP film. Therefore, when such an OHP film is used with a conventional ink-jet printer, each pixel dot becomes small, resulting in a low printing density with too bright portions. As shown in FIG. 2, a dot diameter 3 ejected onto a one-pixel area 1 is smaller than a dot diameter 2 on normal paper as shown in FIG. 1.

OHP films transmit light. However, the conventional recording medium expresses an image pattern with reflected light therefrom. When a comparison is made between a reflected light density from an image printed with an ink having a relatively low ink density but colored in an overall pattern (each ink dot is diffused to reduce the background area), and a transmitted light intensity from an image printed with an ink having a not so low ink density but a relatively wide dot interval and a small dot diameter, the former may appear darker to the human eye.

In order to increase the printing density, the dye content may be increased. However, an increase in the dye content gives rise to problem of clogging of a head channel and the like after a long non-printing period, segregation of the dye and the like. In view of these problems, the dye content cannot be increased above a predetermined level.

A method has been proposed improving printing density on an OHP film by ejecting ink a plurality of times. However, when this same method is adopted for normal paper, due to ejection of a large amount of ink, various other problems are caused including a decrease in resolution, flow of ink, and formation of wrinkles in the paper. Furthermore, since a plurality of ejection operations are performed for each pixel, the recording speed is lowered.

SUMMARY OF THE INVENTION

It is an object of the present invention to provide a recording apparatus which can record at an optimal density on any type of recording medium.

It is another object of the present invention to provide an ink-jet printer which can print at an optimal density on any type of recording medium.

It is still another object of the present invention to allow recording at an optimal intensity by automatically discriminating between a light-transmitting recording medium and other normal recording media.

The above and other objects, effects and features of the present invention will become apparent from the following description taken in conjunction with the accompanying drawings.

BRIEF DESCRIPTION OF THE DRAWINGS

FIGS. 1 and 2 are representations for explaining a conventional method, in which:

FIG. 1 is a representation for explaining printing on normal paper, and

FIG. 2 is a representation for explaining printing on an OHP film;

DETAILED DESCRIPTION OF THE PREFERRED EMBODIMENTS

A color ink-jet printer generally has 4 color ink ejection nozzles for Y (yellow), M (magenta), C (cyan) and Black. Therefore, in order to print a portion of a single color selected from these colors Y, M, C and Black, ink of the corresponding color is printed in a one-pixel area 1. When printing is performed by a subtractive process using the subtractive primaries of R (red), G (green) and B (blue), dots of corresponding colors are printed (R is obtained by superposing M, C and Y).

When a recording medium is light-transmitting and exhibits low ink diffusion such as an OHP film, the dot diameter is small and the printing density becomes low. However, in accordance with the principle of the present invention, a plurality of ink droplets are ejected onto a normal one-pixel area 1 and the ink droplets are shifted by a predetermined distance from each other to allow superposed printing, thereby improving the printing density.

Figure 1:
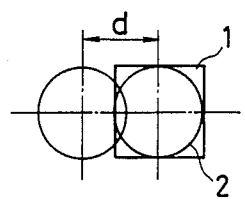
Figure 2:
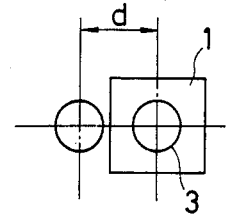
Figure 3:
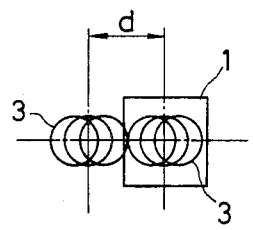
FIGS. 3 to 5 are representations for explaining ink-jet printing according to different examples.

In an example shown in FIG. 3, ink droplets are ejected onto the one-pixel area 1 three times while they are shifted by a predetermined distance in the horizontal direction. Thus, one pixel is expressed by dot diameter 3.

Figure 4:
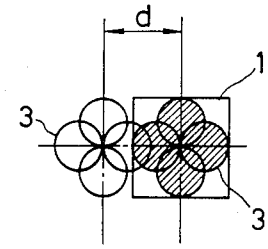
Figure 5:
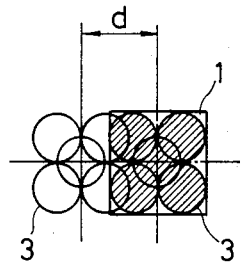

In the example shown in FIG. 4, ink droplets are ejected onto the one-pixel area 1 four times while they are shifted by a predetermined distance in the vertical and horizontal directions. One pixel is therefore expressed by four dot diameter 3. In the example shown in FIG. 5, a dot diameter 3 is printed at the center and the four corners of the one-pixel area 1. Thus, one pixel is expressed with five dot diameters 3.

In the printing methods described above, the shifting of dots for a plurality of ejection operations can be performed by one or both of horizontal and vertical shifting by a predetermined amount. The ink dots may be vertically shifted by providing a fine feed pitch of the recording medium. The ink dots may be horizontally shifted by shifting the delay times for the ejection timings or by providing a fine ejection pitch.

Figure 6:
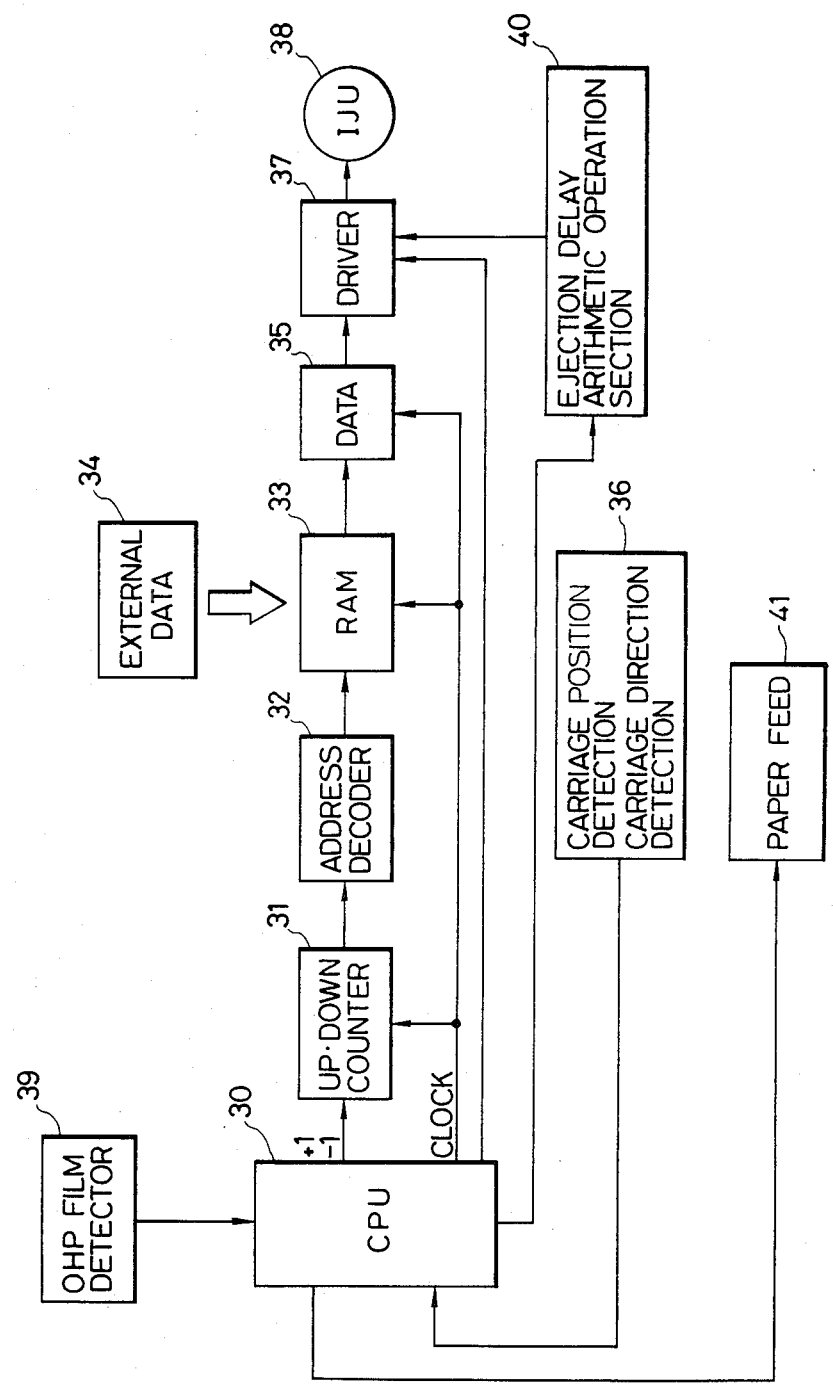
FIG. 6 is a block diagram showing the circuit configuration for shifting dots.

The practical configuration of an ink-jet printer according to an embodiment of the present invention will be described with reference to FIG. 6.

An up-down counter 31 is connected to a CPU (central processing unit) 30 for controlling the recording system. In the forward movement of the head, the counter 31 counts up in synchronism with clock pulses from the CPU 30. A data address corresponding to the count of the counter 31 is generated from an address decoder 32. Recorded data 35 at an address of a RAM (random access memory) 33, connected to external data 34, which is accessed by the data address from the address decoder 32 is read out from the RAM 33 in synchronism with the clock pulses. After confirming the ejection position in accordance with a signal from a carriage position detection section 36, a driver 37 is driven to perform dot-printing on a recording medium through an ink-jet printing unit (IJU) 38 in accordance with the recorded data 35 described above. The unit 38 comprises a nozzle for ejecting droplets of ink onto a recording medium, and a carriage which mounts the nozzle thereon and reciprocates along the recording medium.

An OHP film detector 39 determines whether the recording medium is an OHP film. When the recording medium is determined to be an OHP film, the ejection delay is determined by an ejection delay arithmetic operation section 40, so that dot-printing with shifted ejection timings is performed. When the number of printing operations is represented by N, the dot pitch by D, the carriage speed by V, and the time for printing on a normal printing position of a given dot by T (initial value), ejection is performed while shifting normal printing time T by an ejection delay time $DT = -D/2V + (D[Na+1]/2)/V(N+1)$ where Na is the current printing operation number before all the printing operations are completed and the term $[(Na+1)/2]$ is a Gaussian function.

As shown in the example in FIG. 3, N is set at 3 so that the carriage is reciprocated three times. The contents of the RAM 33 are held and paper feed by a paper feed mechanism 41 is not performed until the number of printing operation reaches N. When the number of printing operation reaches N, the RAM 33 is refreshed and the paper sheet is fed.

In the backward movement of the head, the counter 31 serves as a down counter. The data is read out from the RAM 33 in the reverse order to that during the forward movement of the head, and printing is performed in accordance with the readout data. In order to perform recording as described with reference to FIG. 3, control of the delay time DT described above for the time T is performed.

In the method described above, the dots are shifted horizontally. However, when the dots are shifted vertically, the paper feed pitch is changed by the paper feed mechanism 41. When the dots are to be shifted both vertically and horizontally, control of the delay time and the paper feed pitch by predetermined amounts is performed.

Figure 7:
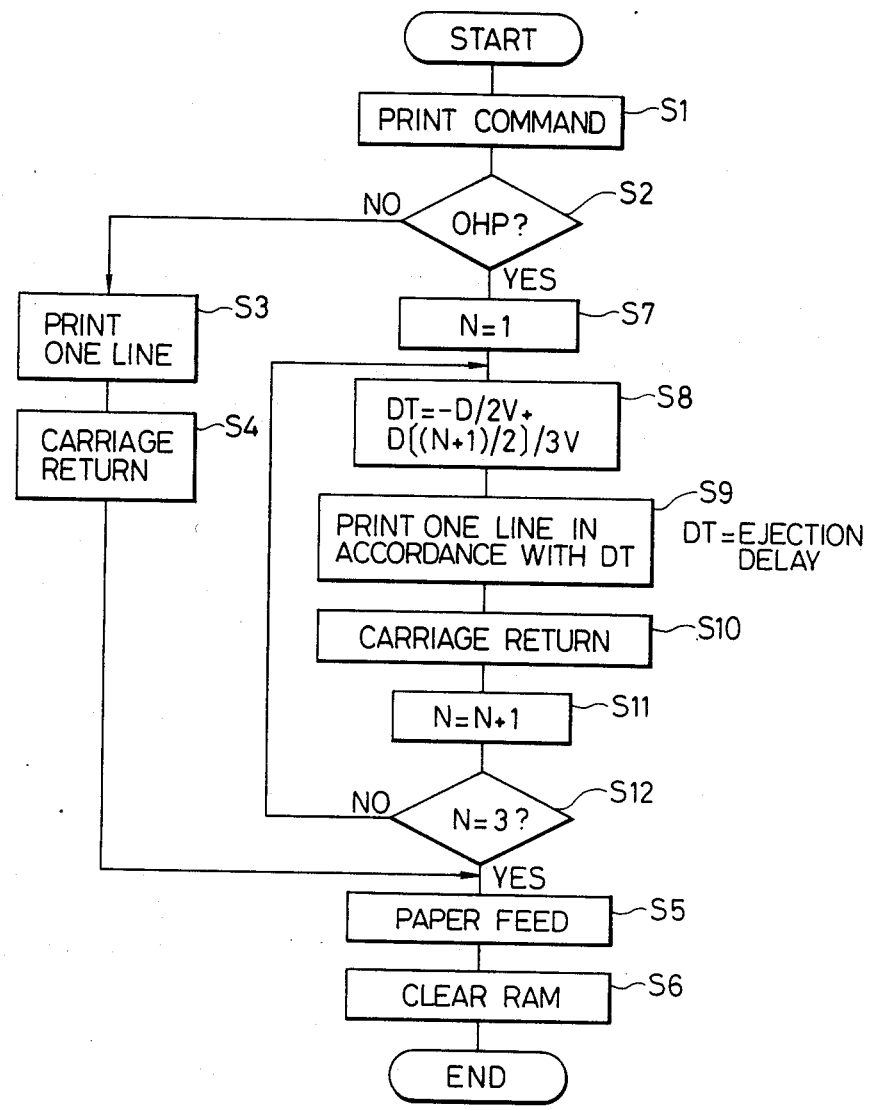
FIG. 7 is a flow chart showing the sequence of operations of the block circuit shown in FIG. 6.

FIG. 7 is a flow chart showing the control sequence of the CPU 30 when printing is performed in the manner as described with reference to FIG. 3. When a print command is received in step S1, it is discriminated in step S2 if the recording medium loaded in the printer is normal paper or an OHP film. This discrimination is performed in accordance with a detection result of the detector 39. If it is determined in step S2 that the loaded recording medium is normal paper, one line printing is performed in step S3, a carriage (not shown) is returned in step S4, one line feed is performed by the paper feed mechanism 41 in step S5, and the contents of the RAM 33 are cleared in step S6. The printing operation either ends or the next line is printed thereafter. However, when it is determined in step S2 that the loaded recording medium is an OHP film, N=1 is set in a counter (not shown) for counting a carriage return number in the CPU 30, in step S7. In step S8, the ejection delay time DT is calculated by the ejection delay arithmetic operation section 40. When N=1, DT=$-D/6V$ which results in a slightly earlier timing than the normal printing timing. However, in practice, an optimal printing timing is obtained since the normal printing timing itself is delayed by a predetermined delay time from the carriage position detection timing. When N=2, DT=0 and when N=3, DT=$D/6V$. Then, dots are printed at sides of a normal dot. In step S9, one line printing of the data from the RAM 33 is performed in accordance with the delay time DT determined in step S8. After a carriage return is performed in step S10, the count of the counter for counting the carriage return number is incremented by one, that is, N=N+1, in step S11. In step S12, it is checked if N=3. If NO in step S12, the flow returns to step S7. If YES in step S12, the flow ends via steps S5 and S6.

Figure 8:
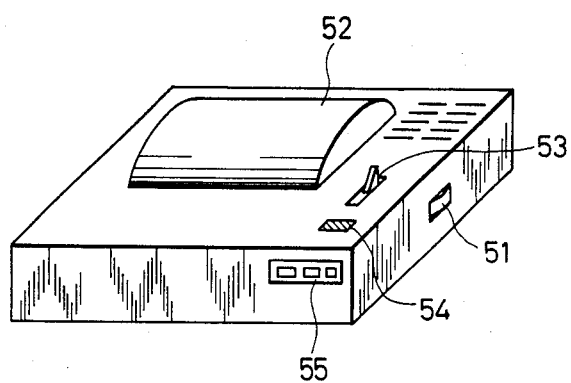
FIG. 8 is a perspective view showing the outer appearance of an ink-jet printer according to an embodiment of the present invention.

FIG. 8 shows an ink-jet printer according to the present invention. The printer has a power switch 51 at its right side. When an upper cover 52 is opened, normal paper or a light-transmitting recording medium such as an OHP film can be loaded through a release lever 53. A control panel 54 is disposed at the front portion of the printer, and a printing operation is performed through the control panel 54. A manual switch 55 is for switching between printing on an OHP film and printing on other types of recording medium. The switch 55 corresponds to the OHP film detector 39 shown in FIG. 6.

Figure 9:
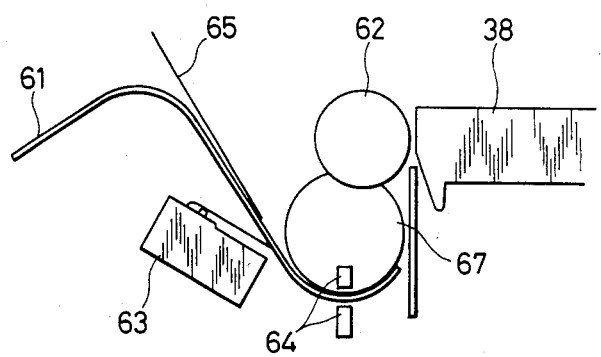
FIG. 9 is a side view showing the vicinity of an ink-jet printing unit according to another embodiment of the present invention.

FIG. 9 shows a mechanism for automatically discriminating between an OHP film having a low ink diffusion property and other normal paper. This mechanism is an example of the OHP film detector 39 shown in FIG. 6. FIG. 9 also shows an example of an ink-jet printing unit 38.

Referring to FIG. 9, an OHP film or recording paper sheet as a recording medium 65 is fed along a paper guide 61 toward a roller 67. A microswitch 63 is arranged along the paper guide 61 to detect the presence/absence of the recording medium 65. When the recording medium 65 contacts the switch 63, the switch detects the presence thereof. Transmitting photo-sensors 64 are arranged in the vicinity of the roller 67 with the paper guide 61 interposed therebetween. When the recording medium 65 is paper, the photo-sensors 64 and the microswitch 63 are operated. When the recording medium 65 is a light-transmitting media such as an OHP film, the microswitch 63 is operated but the photo-sensors 64 are not operated. In this manner, normal paper and light-transmitting media such as OHP films can be discriminated from each other. Note that the photo-sensors 64 detect the presence of a light-transmitting medium such as an OHP film upon detection of light.

The ink-jet printing unit 38 is arranged to oppose a platen 62 and ejects ink droplets in accordance with recording information, thereby recording a dot image.

The mode of operation of the apparatus having the above structure will be described with reference to the flow chart shown in FIG. 10.

When normal paper is loaded as the recording medium 65, it is guided along the paper guide 61 to actuate the microswitch 63 and shields the optical path of the photo-sensors 64 to place the overall system in the normal operation mode. Thereafter, the ink-jet printing unit 38 ejects a one-dot ink droplet for each pixel to perform printing.

However, when an OHP film is loaded as the recording medium 65, the photo-sensors 64 do not produce outputs since the film is transparent. In this case, the unit 38 ejects ink droplets a plurality of times for each pixel to perform printing.

Figure 10:
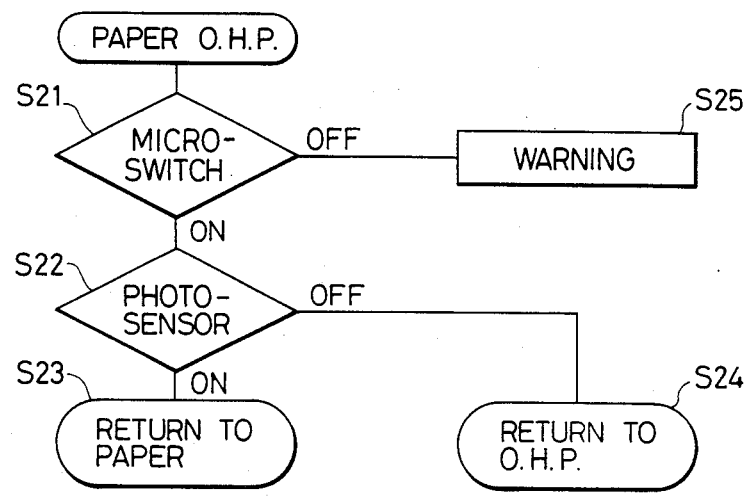
FIG. 10 is a flow chart showing the sequence of operation of the embodiment shown in FIG. 9.

Referring to FIG. 10, the flow advances to a routine for normal paper (step S23) or a routine for an OHP film (step S24) in accordance with a discrimination result based on the outputs from the microswitch 63 and the photo-sensors 64 in steps S21 and S22. When no output is obtained from the microswitch 63, a warning is generated in step S25.

In this manner, when an OHP film is loaded as the recording medium 65, the amount of ink ejected onto a single pixel is increased to increase the printing density per pixel. In this case, the overall dot diameter is increased from that of a single dot, resembling the case of normal paper printing (this fact indicates that the space between the dots is narrowed and the background area is decreased).

With a simple operation as described above, a clear image with a high recording density can be printed on even an OHP film. Thus, when the printed OHP film is projected onto a screen via transmitting light, an excellent image is obtained.

In the above embodiment, the photo-sensors may be of reflecting type. Furthermore, the positional relationship between the microswitch and the photosensors may be other than that described above.

Figure 11:
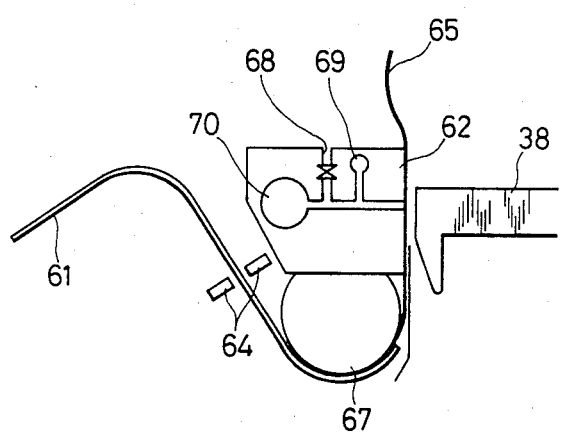
FIG. 11 is a side view of the vicinity of an ink-jet printing unit according to still another embodiment of the present invention.

In order to provide a good contact between the recording medium and the platen, the recording medium may be drawn by vacuum suction. FIG. 11 illustrates such an embodiment. In FIG. 11, the same reference numerals as in FIG. 9 denote the same parts and a detailed description thereof is omitted. Referring to FIG. 11, a recording medium 65 is drawn by suction by a negative pressure source 70 to be in tight contact with a platen. The printing quality is further improved in this embodiment. The negative pressure thus produced may be released through a release valve 68. A pressure sensor 69 is arranged in the suction fluid path and detects the negative pressure therein. A similar effect as obtained with the microswitch and the photo-sensors described above can be obtained with the negative pressure and the outputs from photo-sensors 64.

Although the present invention has been described with reference to particular embodiments, the present invention is not limited thereto. For example, a similar effect as that obtained with an OHP film can be obtained with superposed printing even if a recording medium is normal paper coated with a synthetic resin, normal paper impregnated with silicone or the like, or special treated paper having a low ink diffusion property, or the like. Furthermore, the ink need not be printed a plurality of times, but the ink corresponding to the plurality of printing operations may be ejected by a single ejection operation. The present invention is not limited to an ink-jet printer but can be adopted by a wide range of printers which print images by attaching printing materials onto printing media.

What I claim is:

1. A recording apparatus comprising:
    recording means for recording an image by attaching dots of a recording material onto a recording medium in accordance with data;
    determining means for determining a type of the recording medium; and
    control means for controlling a density of the image recorded by said recording means in accordance with a determination result of said determining means in such a manner that a plurality of dots are attached onto a particular type of recording medium for individual pixels in the image and the plurality of dots are shifted by a predetermined amount to permit superposed printing.

2. An apparatus according to claim 1, wherein said recording means comprises an ink-jet recording unit for recording an image on the recording medium by transferring droplets of ink onto the recording medium, and said control means controls the amount of ink transferred per pixel of the image in accordance with the determination result of said determining means.

3. An apparatus according to claim 2, wherein said determining means comprises a change-over switch for switching between a light-transmitting recording medium and another type of recording medium.

4. An apparatus according to claim 2, wherein said determining means includes a detector for detecting, by utilizing light transmission, whether the recording medium is a light-transmitting recording medium or another type of recording medium.

5. An apparatus according to claim 2, wherein said determining means comprises a change-over switch for switching between a recording medium that exhibits high ink diffusion and a recording medium that exhibits a low ink diffusion.

6. A recording apparatus comprising:
    recording means for recording an image by scanning along a recording medium and ejecting ink droplets onto the recording medium;
    determining means for determining a type of the recording medium; and
    control means for controlling said recording means so as to perform a plurality of ink ejection operations to eject a plurality of droplets onto the recording medium for individual pixels in the image in such a manner that the plurality of droplets are shifted by a predetermined amount to permit superposed printing when said determining means determines that the recording medium is of a particular type.

7. An apparatus according to claim 6, wherein said control means includes delay means for delaying the plurality of ink ejection operations per pixel such that the ink droplets are ejected at shifted positions.

8. An apparatus according to claim 6, wherein said control means provides the plurality of ink ejection operations by a plurality of scanning operations of said recording means.

9. A recording apparatus comprising:
   recording means for recording an image by attaching dots of a recording material onto a recording medium;
   switching means for switching between a first mode for recording on a light-transmitting recording medium and a second mode for recording on another type of recording medium; and
   control means for changing a density of the image recorded by said recording means in accordance with a switching operation of said switching means, wherein in the first mode a plurality of dots are attached onto the recording medium for individual pixels in the image and the plurality of dots are shifted by a predetermined amount to permit superposed printing.

10. An apparatus according to claim 9, wherein said recording means comprises an ink-jet recording unit for recording an image by transferring droplets of ink onto the recording medium, and said control means increases an amount of ink recorded per pixel of the image in said second mode above that in said first mode.

* * * * *